United States Patent
Chang et al.

(10) Patent No.: US 6,482,764 B1
(45) Date of Patent: *Nov. 19, 2002

(54) METHOD FOR PRODUCING A SUPPORTED CATALYST FOR ETHYLENE POLYMERIZATION AND ETHYLENE/α-OLEFIN COPOLYMERIZATION

(75) Inventors: Ho-Sik Chang; Youn-Kyung Kang, both of Taejeon (KR); Vladimir Alexandrovich Zakharov, Novosibirsk; Valentin Evgenievich Nikitin, Truzhennikov per., both of (RU)

(73) Assignee: Samsung General Chemicals Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,025

(22) Filed: Apr. 16, 1999

(30) Foreign Application Priority Data

Apr. 17, 1998 (KR) ............................................. 98-13708

(51) Int. Cl.[7] ........................... B01J 31/00; B01J 37/00; C08F 4/02; C08F 4/60
(52) U.S. Cl. ..................... 502/103; 502/109; 502/107; 502/108; 502/115; 502/126; 502/128
(58) Field of Search ................................. 502/103, 104, 502/112, 113, 115, 116, 118, 128, 108, 107

(56) References Cited

U.S. PATENT DOCUMENTS

| 3,878,124 A | 4/1975 | Durand et al. |
| 4,069,169 A | 1/1978 | Toyoda et al. .......... 252/429 B |
| 4,071,672 A | 1/1978 | Kashiwa .................... 526/122 |

(List continued on next page.)

FOREIGN PATENT DOCUMENTS

| DE | 2 153 520 | 5/1972 |
| DE | 2 230 672 | 12/1972 |
| DE | 2 230 728 | 12/1972 |
| DE | 2 230 752 | 12/1972 |
| DE | 25 04 036 | 8/1975 |
| DE | 26 05 922 | 8/1976 |
| DE | 25 53 104 | 6/1977 |
| EP | 0 350 170 | 3/1994 |
| EP | 0 602 922 | 6/1994 |
| EP | 0 606 125 | 7/1994 |
| JP | 58-83006 | 5/1983 |
| JP | 63-54004 | 10/1988 |

OTHER PUBLICATIONS

Abstracts of BE895019 published Mar. 1983, DE3241999 published May 1983, GB2111066 published Jun. 1983, and US4952649 published Aug. 1990, printed from Dialog Web.
Abstract of JP7316987 published Dec. 1995.

(List continued on next page.)

*Primary Examiner*—Mark L. Bell
*Assistant Examiner*—J. Pasterczyk
(74) *Attorney, Agent, or Firm*—Eric B. Meyertons

(57) ABSTRACT

A method for producing a supported catalyst useful in polymerization of ethylene and copolymerization of ethylene and α-olefin is disclosed. The method includes treating the magnesium-containing carrier with a titanium compound containing oxygen atom(s), wherein said carrier is obtained by reaction of an organomagnesium compound of the structure of $MgPh_2.nMgCl_2.mR_2O$ (n=0.37~0.7; m≧1; $R_2O$= ether; Ph=phenyl) with an organic chloride compound in a mole ratio of organic chloride compound/Mg≧0.5, at −20~80° C. In one embodiment, the organic chloride compound may be carbon tetrachloride. A specific catalyst is provided whose activity is low in the beginning but slowly rises to a sufficient degree as the process of polymerization progresses, the polymer produced with the use of said catalyst having high bulk density, a well adjusted particle size distribution, and a narrow molecular weight distribution.

10 Claims, 1 Drawing Sheet

U.S. PATENT DOCUMENTS

| | | | |
|---|---|---|---|
| 4,071,674 A | 1/1978 | Kashiwa et al. | 526/125 |
| 4,076,924 A | 2/1978 | Toyota et al. | 526/125 |
| 4,085,276 A | 4/1978 | Toyota et al. | 526/122 |
| 4,107,413 A | 8/1978 | Giannini et al. | 526/114 |
| 4,107,414 A | 8/1978 | Giannini et al. | 526/114 |
| 4,156,063 A | 5/1979 | Giannini et al. | 526/114 |
| 4,157,435 A | 6/1979 | Toyota et al. | 526/125 |
| 4,187,196 A | 2/1980 | Giannini et al. | 252/429 B |
| 4,220,554 A | 9/1980 | Scatá et al. | 252/429 B |
| 4,226,963 A | 10/1980 | Giannini et al. | 526/114 |
| 4,315,835 A | 2/1982 | Scatá et al. | 252/429 B |
| 4,315,874 A | 2/1982 | Ushida et al. | 264/5 |
| 4,330,649 A | 5/1982 | Kioka et al. | 526/125 |
| 4,336,360 A | 6/1982 | Giannini et al. | 526/114 |
| 4,355,143 A * | 10/1982 | Lassalle et al. | 526/119 |
| 4,399,054 A | 8/1983 | Ferraris et al. | 252/429 B |
| 4,401,589 A | 8/1983 | Kioka et al. | 252/429 B |
| 4,439,540 A | 3/1984 | Cecchin et al. | 502/125 |
| 4,477,639 A | 10/1984 | Nielsen | |
| 4,518,706 A | 5/1985 | Gessell | |
| 4,613,655 A | 9/1986 | Longi et al. | 526/114 |
| 4,806,433 A | 2/1989 | Sasaki et al. | 502/115 |
| 4,816,433 A | 3/1989 | Terano et al. | |
| 4,829,037 A | 5/1989 | Terano et al. | |
| 4,843,049 A | 6/1989 | Invernizzi et al. | |
| 4,847,227 A | 7/1989 | Murai et al. | |
| 4,866,022 A | 9/1989 | Arzoumanidis et al. | 502/120 |
| 4,912,074 A | 3/1990 | Miro | 502/104 |
| 4,946,816 A | 8/1990 | Cohen et al. | 502/126 |
| 4,952,649 A | 8/1990 | Kioka et al. | 526/125 |
| 4,962,167 A | 10/1990 | Shiraishi et al. | |
| 4,970,186 A | 11/1990 | Terano et al. | |
| 4,978,648 A | 12/1990 | Barbé et al. | 502/127 |
| 4,988,656 A | 1/1991 | Arzoumanidis et al. | 502/127 |
| 4,990,479 A | 2/1991 | Ishimaru et al. | 502/125 |
| 5,013,702 A | 5/1991 | Arzoumanidis et al. | 502/120 |
| 5,059,570 A | 10/1991 | Bailly et al. | |
| 5,061,667 A * | 10/1991 | Murata et al. | 502/116 |
| 5,081,090 A | 1/1992 | Arzoumanidis et al. | 502/126 |
| 5,106,807 A | 4/1992 | Morini et al. | |
| 5,124,297 A | 6/1992 | Arzoumanidis et al. | 502/120 |
| 5,130,284 A | 7/1992 | Terano et al. | |
| 5,134,104 A | 7/1992 | Sasaki et al. | 502/103 |
| 5,175,332 A | 12/1992 | Chatterton et al. | 556/482 |
| 5,182,245 A | 1/1993 | Arzoumanidis et al. | 502/715 |
| 5,459,116 A | 10/1995 | Ro et al. | |
| 5,502,128 A | 3/1996 | Flores et al. | 526/160 |
| 5,585,317 A | 12/1996 | Sacchetti et al. | |
| 5,587,440 A | 12/1996 | Ehlers et al. | |
| 5,696,044 A * | 12/1997 | Zakharov et al. | 502/126 |
| 5,726,261 A | 3/1998 | Sacchetti et al. | |
| 5,780,378 A | 7/1998 | Toida et al. | 502/126 |
| 5,844,046 A | 12/1998 | Ohgizawa et al. | 525/270 |
| 5,849,654 A | 12/1998 | Fushimi et al. | 502/125 |
| 5,968,862 A | 10/1999 | Abbott et al. | |
| 6,214,759 B1 * | 4/2001 | Chang et al. | 502/103 |

OTHER PUBLICATIONS

Abstract of JP52087486 published Jul. 1977.
Abstract of JP51136625 published Nov. 1976.
Abstract of JP7316986 published Dec. 1995.
Abstract of KR9202488 published Jan. 1990.
Abstract of KR9300665 published Sep. 1990.
Abstract of CA1040379 published Oct. 1978.
Invention Abstract for Pub. No. 63–191811 (JP), Pub. Date Aug. 9, 1988.
Invention Abstract for Pub. No. 63–40711 (JP), Date Dec. 13, 1994.
Tinkler et al., "Polymerisation of ethene by the novel titanium complex [Ti(Me$_3$SiN CH$_2$CH$_2$NSiMe$_3$) Cl$_2$]; a metallocene analogue," Chem. Commun., 1996, pp. 2623–2624.
Edelmann, "N–silylated benzamidines: versatile building blocks in main group and coordination chemistry," Coordination Chemistry Reviews, 137, 1994, pp. 403–481.
Zhou et al., "Synthesis and Structure of Novel Bridged Dinuclear Indium Complexes," Inorg. Chem. 1996, 35, pp. 1423–1424.
Zhou et al., "Bulky Amidinate Complexes of Tin(IV). Synthesis and Structure of Sn(RNC(R')NR)$_2$Cl$_2$ (R=Cyclohexyl, R'=H, Me; R=SiMe$_3$, R'=$^t$Bu)," Inorg. Chem. 1997, 36, pp. 501–504.
Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," J. Am. Chem. Soc. 1995, 117, pp. 3008–3021.
Stokes et al, "Reactions of Cobaloxime Anions and/or Hydrides with Enynes as a New, General Route to 1,3–and 1,2–Dienylcobaloxime Complexes," Organometallics 1996, 15, pp. 2624–2632.

* cited by examiner

METHOD FOR PRODUCING A SUPPORTED CATALYST FOR ETHYLENE POLYMERIZATION AND ETHYLENE/α-OLEFIN COPOLYMERIZATION

BACKGROUND OF THE INVENTION

The present disclosure relates to a method for producing a catalyst for use in polymerization of ethylene and copolymerization of ethylene and α-olefin, and more particularly to a method for producing a catalyst containing a transition metal supported on a magnesium-containing carrier whose initial activity is low but slowly increases to an optimal level as the polymerization progresses.

A method was developed some time ago for producing a supported catalyst for polymerization of ethylene and copolymerization of ethylene and α-olefin, by following the way of coating catalysts with a transition metal compound, that is, first reacting an organomagnesium compound having the structure of $MgPh_2 \cdot nMgCl_2 \cdot mR_2O$ (here, n=0.37~0.7; m≧2; $R_2O$=ether; Ph=phenyl) with an organic halide, and next coating the thus produced carrier with such transition metal compounds as $TiCl_4$, $VCl_4$, or $VOCl_3$ (Application No. 330675/1995 for a Japanese patent).

However, the catalyst produced by the publicly known art above, particularly the catalyst produced by the way of coating the carrier with $TiCl_4$, is found having such problems as a broad molecular weight distribution and high initial activity, though it has the polymerization process partly improved by producing a polymer having a narrow particle size distribution and an increased bulk density.

A way of effectively preventing generation of lumps in the reactor by adjusting the initial polymerization activity to a low point in the process of gaseous fluidized bed polymerization is publicly known. It is also a public knowledge that the quality of products can be improved by decrease of the output of polymers of low molecular weights to be extracted by hexane, if the polymer in use is of a narrow molecular weight distribution, especially in the case of products of linear low-density polyethylene produced by copolymerization of ethylene and α-olefin.

In view of all this, a catalyst is particularly demanded whose activity is low in the initial stage but slowly increases to an optimal activity as the polymerization progresses.

SUMMARY OF THE INVENTION

A method for producing a catalyst, which may make it possible to produce a polymer of a narrow particle size distribution and an increased bulk density, has a low activity in the initial stage but slowly increasing to an optimal level accordingly as the ethylene polymerization or ethylene/α-olefin copolymerization by slurry or gaseous process progresses, and is useful in ethylene polymerization or ethylene/α-olefin copolymerization, especially in the gaseous environment, is herein described.

BRIEF DESCRIPTION OF THE DRAWING

The above brief description as well as further objects, features and advantages of the methods of the present invention will be more fully appreciated by reference to the following detailed description of presently preferred but nonetheless illustrative embodiments in accordance with the present invention when taken in conjunction with the accompanying drawing in which.

DETAILED DESCRIPTION OF THE INVENTION

Figure 1:
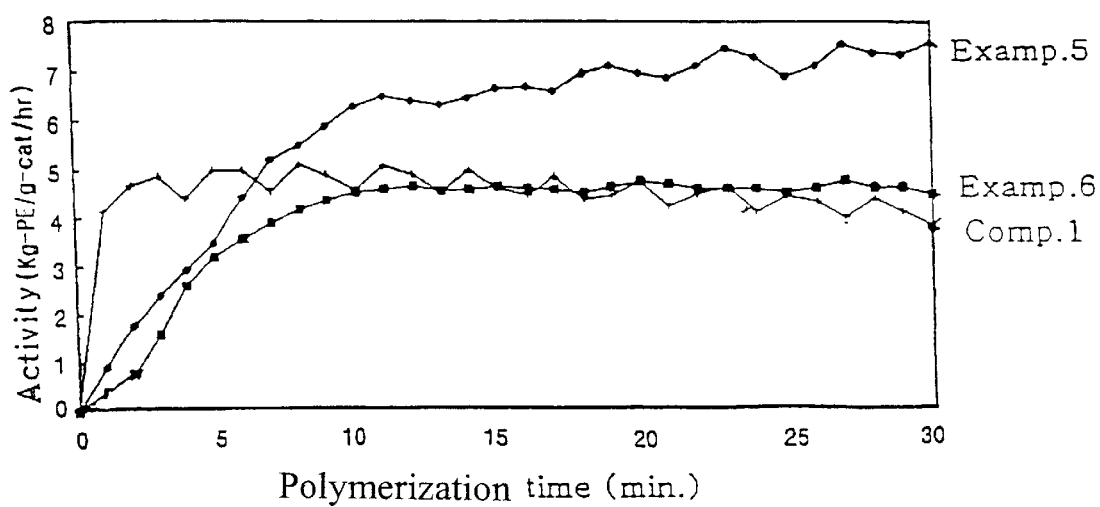
FIG. 1 shows the reaction rate curves in the ethylene polymerization by the use respectively of the catalyst produced in examples of the present invention and the catalyst by a comparative example.

The method for producing the catalyst includes treating a carrier obtained by reacting an organomagnesium compound, $MgPh_2 \cdot nMgCl_2 \cdot mR_2O$ (here, n=0.37~0.7; m≧1; $R_2O$=ether; Ph=phenyl) with an organic chloride compound, with a titanium compound containing oxygen atom(s).

The organomagnesium compound used when the magnesium-containing carrier is produced is obtained by reacting magnesium in powder form and chlorobenzene in the presence of more than one electron-donating compounds. The electron-donors may include aliphatic ethers and cyclic ethers. The aliphatic ethers, here, can be represented by a general formula of $R^2OR^3$, where $R^2$ or $R^3$ are identical or different alkyl radical with two to eight carbons, and preferably an aliphatic ether having four to five carbons. The cyclic ethers are those having three or four carbons. The most preferable as electron donors are dibutyl or diisoamylethers.

The magnesium-containing carrier is produced by reacting, at −20 to 80° C., a solution of said organomagnesium compound with one or more organic chlorides, preferably carbon tetrachloride, in a mole ratio of organic chloride compound/Mg≧0.5. The suspension of the carrier powder containing magnesium, obtained at this stage, has a particular particle size and a narrow particle size distribution.

The organic chlorides, may include compounds having the general formula $CR'_nCl_{(4-n)}$ (here, n is an integer from 0 to 3), wherein R' is an alkyl radical, having from 1 to 12 carbons.

The catalyst is obtained by treating the magnesium-containing carrier produced by the method given above with an oxygen atom-containing titanium compound, in a mole ratio of Ti/Mg=0.01~2.0, preferably 0.04~0.5, in a hydrocarbon solvent, at 20~100° C., preferably 40~80° C.

If, the Ti/Mg mole ratio is higher than 2.0, it generally becomes necessary to remove the extra quantity of a titanium compound which has not been fixed on the supporter (carrier) during the process of washing the catalyst, and this removal of a titanium compound is invariably costly and troublesome because of its toxic and corrosive properties. If, the Ti/Mg mole ratio is lower than 0.01, the activity is proven to be insufficient.

The oxygen atom-containing titanium compound, in one embodiment has the general formula, $Ti(OR)_aX_{4-a}$. R represents an aliphatic or aromatic hydrocarbon group having 1 to 14 carbons, or alternatively, COR'(here, R' represents an aliphatic or aromatic hydrocarbon group having 1 to 14 carbons), X represents Cl, Br, or I, and "a" represents 1, 2, or 3. The titanium compound of the above formula is made by mixing $Ti(OR)_4$ and $TiX_4$, the mixture ratio being preferably 1:1. The preferable titanium compounds are titanium alkoxychlorides, e.g. $Ti(OC_3H_7)_2Cl_2$, $Ti(OC_3H_7)Cl_3$, $Ti(OC_3H_7)_3Cl$, $Ti(OC_4H_9)_2Cl_2$, $Ti(OC_4H_9)Cl_3$, $Ti(OC_4H_9)_3Cl$, $Ti(OCH_2CH(C_2H_5)(CH_2)_3CH_3)_2Cl_2$, and $Ti(OCH_2CH(C_2H_5)(CH_2)_3CH_3)Cl_3$.

Before the catalyst with titanium or after production of the catalyst the catalyst may be treated with an organoaluminum compound in a mole ratio of Al/Ti=0.1~2.

The preferable Al/Ti mole ratio is 0.5~1.5, the preferable temperature 30~80° C. If too much organic aluminum is used, the carrier may be destroyed, giving rise to fine particles. For the organoaluminum compound, such an organoalkylaluminum having the general formula of $AlR'_n X_{(3-n)}$ or an organic aluminum halogen compound can be used. Here, R' stands for an alkyl group having 1 to 16, more preferably, 2 to 12 carbons, X for chlorine, bromine, and other halogen compounds, and n an integer from 0 to 3, or fractions. Such organic aluminum compounds within the category include triethylaluminum, triisobutylaluminum, trihexylaluminum, trioctylaluminum, ethylaluminum chloride, methylaluminum chloride, ethylaluminum sesquibromide, isobutylaluminum sesquichloride, dimethylaluminum chloride, diethylaluminum chloride, diethylaluminum bromide, diethylaluminum iodide, di-n-propylalaminum chloride, di-n-butylaluminum chloride, diisobutylaluminum chloride, di-n-octylaluminum iodide, methylaluminum dichloride, ethylaluminum dichloride, isobutylaluminum dichloride, -n-butylaluminum dichloride, etc. Of all these, the more profitable organic aluminum compound can be chosen from dialkylaluminum chlorides or from ethylaluminum sesquichlorides.

In the method for production of the catalyst in the process of forming the magnesium-containing carrier, a complex of organomagnesium compounds [$MgPh_2 \cdot nMgCl_2 \cdot mR_2O$] is used in the state of solution, dissolved in chlorobenzene, ether ($R_2O$), or a mixture of chlorobenzene and ether, or a mixture of chlorobenzene and aliphatic or aromatic compounds.

The aforesaid organomagnesium compound in the state of solution is chlorinated with organic chloride in the mole ratio of the organic chloride compound/Mg$\geq$0.5, at $-20$ to $80°$ C. The organic chloride diluted in a hydrocarbon solvent can be used in the chlorination of organomagnesium compound. In this way, a carrier with the magnesium in powder form suspended in the solvent is produced. The carrier obtained in this way possesses a narrow particle size distribution. The particle sizes of the carrier and the catalyst can be adjusted in the range from 5 to 150 $\mu$m according to the conditions of the composition of the organomagnesium compounds and of the reaction of the organomagnesium compounds and the organic chloride compound.

The magnesium-containing carrier obtained as above mainly contains, magnesium dichloride (80~90 wt %), ether (7~15 wt %), and a hydrocarbon complex (1~5 wt %).

The catalyst is produced by treating the carrier with a titanium compound ($Ti(OR)_a X_{4-a}$) solvent, in a hydrocarbon solution. If, when producing the catalyst, the mole ratio of $Ti(OR)_a X_{4-a}/Mg$ is raised from 0.01 to 2.0, the Ti content of the catalyst rises from 1 wt % to 10 wt %, the activity per g-catalyst also rising. If $TiCl_4$ is used alone as the titanium compound, the Ti content in the catalyst only rises from 1 wt % to 3 wt % even if the mole ratio of $TiCl_4/Mg$ is raised from 0.01 to 2.0. When $TiCl_4$ is used alone for the titanium compound the initial activity of the catalyst becomes high, while the catalyst's initial activity is kept low if the titanium compound of $Ti(OR)_a X_{4-a}$ is used thus, possibly preventing formation of lumps by the hot spot inside the gaseous fluidized bed reactor.

The method provides a catalyst which is highly-active, has a narrow particle size distribution and various average granule sizes, and is thus useful for various purposes.

For example, the described method can produce a catalyst with the particle size of 5~10 $\mu$m and 10~15$\mu$m, useful in slurry polymerization of ethylene, and of 25~150 $\mu$m, useful in gaseous polymerization of ethylene. When a titanium compound, $Ti(OR)_a X_{4-a}$ is used for the active substance of the catalyst, a polyethylene having a narrow molecular weight distribution is obtained. The narrow molecular weight distribution is characterized by the melt index ratio, $MI_{21.6}/MI_{2.16} < 30$.

The catalyst can be coated, for pre-polymerization, with 3~150 g of an ethylene monopolymer or a copolymer of ethylene and $\alpha$-olefin per one gram of the catalyst for polymerization.

The catalyst is used in both ethylene polymerization and ethylene/$\alpha$-olefin copolymerization. The catalyst may be used together with one or more organic aluminum compounds, or preferably trialkylaluminum, as its cocatalyst.

The usable organic aluminum compound has a general formula: $AlR_n X_{3-n}$. Here, R is an alkyl radical having 1 to 12 carbons; X a hydrogen atom, halogen atoms such as chlorine or fluorine and an alkoxy radical having 1 to 12 carbons; and n an integer of 1 to 3 or a fraction. For example, triisobutylaluminum, triethylaluminum, trimethylaluminum, tri-n-hexylaluminum, tri-n-octylaluminum, ethylaluminum sesquichloride, and diethylaluminum chloride, etc. can be used.

The polymerization can be performed either in a hydrocarbon solvent (e.g., hexane or heptane) at 50~100° C. by a slurry polymerization process, or in the absence of a hydrocarbon solvent at 60~120° C. and under 2~40 atm pressure by a gaseous polymerization process. As an agent for adjusting the molecular weights of polymers hydrogen (5~90 bulk %) is used. Propylene, 1 butene, 1 hexene, 4 methyl-1-pentene and other $\alpha$-olefins are useful in an ethylene/$\alpha$-olefin copolymerization.

The gaseous polymerization reaction is performed in a fluidized bed reactor using the publicly known fluidization process (See. C. Y. Wen and Y. H. Yu "Mechanics of Fluidization". Chemical Engineering Progress Symposium Series Vol. 62, p. 100~111 (1962)).

Generally, a mixture for gaseous reaction flows out from the upper part of the reactor to recycle through a recycling tube, thermo-exchanger, and a compressor. During this recycling process, the mixture that has reacted in gaseous phase is generally cooled by the use of the thermo-exchanger to remove the heat generated by the polymerization reaction. The polymerization is generally performed at a temperature between 0° C. and 120° C. The mixture for gaseous reaction may contain hydrogen and an inert gas such as nitrogen, methane, ethane, propane, butane, isobutane, etc. as molecular weight adjuster as well as such monomers as ethylene and such comonomers as $\alpha$-olefin. When a fluidized bed reactor is used, the rate at which the mixture for gaseous reaction passes the fluidized bed is preferably twice to eight times as much as the minimum fluidization rate, namely 20~80 cm/sec in general. The produced polymer is removed from the reactor continuously or intermittently, or preferably, at a constant rate.

Below, the present invention is described in further detail, referring to examples of its embodiment. Yet, the following examples do not limit the scopes of the present invention.

EXAMPLE 1

<A> Production of organomagnesium compounds

Inside a 1-liter glass reactor equipped with stirrer and temperature controller, 29.2 g of magnesium powder (1.2 mol) and 450 ml of chlorobenzene (4.4 mol) were reacted in the presence of a solution in which 203 ml of dibutylether (1.2 mol), 3 ml of butylchloride and 0.05 g of iodine as initiator were dissolved. The reaction was performed, while stirring, at 80~100° C. in an inactive gaseous environment (nitrogen, argon) for 10 hours. Next, the reacted mixture was left alone, without stirring, for 12 hours, and then the liquid was separated from the precipitate. The liquid was a solution of the organomagnesium compound having the formula, $MgPh_2.0.49MgCl_2.2(C_4H_9)_2O$, dissolved in chlorobenzene (the concentration of Mg being 1.1 mol per liter).

<B> Production of carrier 100 ml (Mg of 0.11 mol) of the solution obtained in <A> above was put in a reactor equipped with a stirrer, and 21.2 ml of $CCl_4$ (0.22 mol of $CCl_4$) dissolved in heptane of 42 ml was added to it at 20° C., in the period of an hour. The mixture was stirred at the same temperature for 60 minutes, the solvent was removed, and the precipitate was washed in 100 ml of n-hexane at 60° C. four times. In this way, 11.8 g of magnesium containing carrier in powder form was obtained in a state of suspension in n-hexane.

<C> Production of catalyst

To the n-hexane suspension of the magnesium containing carrier was added so much titanium alkoxychloride, which was produced by mixing 6 ml of $TiCl_4$ and 15.1 ml of titanium propoxide($Ti(OC_3H_7)_4$), that the Ti/Mg mole ratio reached 1, the mixture was then heated to 60° C., stirred for two hours, and the solid precipitate thus obtained was washed in 100 ml of n-hexane at 60° C. four times. Thus a catalyst containing Ti by 5.9 wt % was produced. The average particle size of the catalyst was 55 μm.

<Polymerization>

The ethylene polymerization was performed inside a 2-liter steel reactor equipped with a stirrer and a temperature controller. N-hexane (1000 mol) was used as hydrocarbon solvent, and 2 mmol of $Al(i-Bu)_3$ as cocatalyst. The polymerization was performed under 7.5 atm of ethylene pressure, 4.5 atm of hydrogen pressure, at 80° C. for one hour.

The curves showing the reaction rate according to the different activities of the catalyst were analyzed by the use of a meter for calculating the mass flux of ethylene and a computer for translating the measured flux speed into curves. The data on the results of the polymerization are given in Table 1.

For the experiments so much of the catalyst as amounted to 0.015 mmol of Ti was taken, the catalytic activity confirmed being 4.0 kg PE per gram of catalyst. The melt index (MI) of the polyethylene was determined to be 1.6 g/10 min under the load of 2.16 kg at 190° C., and the MI fraction for 21.6 kg and 2.16 kg was 29. The bulk density of polyethylene powder was 0.37 g/cm³ and it had a narrow particle size distribution. The SPAN value calculated by the following formula from the analyses of the powdery form was 0.6 or less. SPAN=(d90-d10)/d50. Here, d90, d50, and d10 indicate the respective sizes of polyethylene particles with their total respective particle contents of 90 wt %, 50 wt %, and 10 wt %.

EXAMPLE 2

A catalyst was produced in exactly the same way as in Example 1, except that so much of $TiCl_2(OC_3H_7)_2$ produced by mixing 1.5 ml of $TiCl_4$ and 3.8 ml of titanium propoxide $(Ti(OC_3H_7)_4)$, was added to the n-hexane suspension of the magnesium containing carrier obtained in Example 1 that the Ti/Mg mole ratio reached 0.25. Consequently, a catalyst containing Ti by 3.3 wt % was obtained. The polymerization of ethylene was performed in the same way as in Example 1. The results of the ethylene polymerization are given in Table 1.

EXAMPLE 3

<A> Production of organomagnesium compounds

Inside a 6-liter glass reactor equipped with a stirrer and a temperature controller, 145.4 g of magnesium powder (6 mol) and 1,512 ml of chlorobenzene (15 mol) were reacted in the presence of a solution in which 2,435 ml of diisoamyl ether (12 mol), 21 ml of butylchloride and 1.45 g of iodine as initiator were dissolved. The reaction was performed, while stirring, at 80~100° C. in an inactive gaseous environment (nitrogen, argon) for 10 hours. Next, the reacted mixture was left alone, without stirring, for 12 hours, and then the liquid was separated from the precipitate. The liquid was a solution of the organomagnesium compound of the formula, $MgPh_2.0.49MgCl_2.1.5(C_6H_{13})_2O$, dissolved in chlorobenzene (the concentration of Mg being 0.83 mol per liter).

<B> Production of carrier 2,500 ml (2.1 mol of Mg) of the obtained solution was put in a reactor equipped with a stirrer, and 200 ml of $CCl_4$ (2.1 mol of $CCl_4$) dissolved in 200 ml of heptane was added to it at 50° C., in the period of an hour. The mixture was stirred at the same temperature for 60 minutes, the solvent was removed, and the precipitate was washed in 2,000 ml of n-hexane at 60° C. four times. In this way, 219 g of the magnesium containing carrier in powder form was obtained in a state of suspension in n-hexane.

<C> Production of catalyst

To the n-hexane suspension of the magnesium containing carrier (0.35 mol of $MgCl_2$) was added so much $TiCl_2(OC_3H_7)_2$ which was produced by mixing 18.8 ml of $TiCl_4$ and 47.6 ml of titanium propoxide $(Ti(OC_3H_7)_4)$, that the Ti/Mg mole ratio reached 1, the mixture was then heated to 60° C., stirred for two hours, and the solid precipitate thus obtained from it was washed in 350 ml of n-hexane at 60° C. four times. Thus a catalyst containing Ti by 9.7 wt % was produced. The average particle size of the catalyst was 50 μm. The ethylene polymerization was performed in the same way as in Example 1. The results of ethylene polymerization are given in Table 1.

EXAMPLE 4

A catalyst was produced in the same manner as in Example 3 except that to the n-hexane suspension of the magnesium containing carrier obtained in Example 3 was added so much of the $TiCl_2(OC_3H_7)_2$ produced by mixing 4.7 ml of $TiCl_4$ and 11.9 ml of titanium propoxide (Ti $(OC_3H_7)_4$) that the Ti/Mg mole ratio reached 0.25, and the catalyst obtained in this way contained Ti by 3.5 wt %. The ethylene polymerization was performed in exactly the same way as in Example 1, the results being given in Table 1.

EXAMPLE 5

A catalyst was produced in the same way as in Example 3 except that to the n-hexane suspension of the magnesium containing carrier obtained in Example 3 was added so much of the $TiCl_2(OC_3H_7)_2$ produced by mixing 4.7 ml of $TiCl_4$ and 11.9 ml of titanium propoxide $(Ti(OC_3H_7)_4)$ that the Ti/Mg mole ratio reached 0.25 and that the product was treated with 0.088 mol of diethylaluminum chloride (Al/Ti mole ratio=1), before washing, and thereupon, a catalyst containing Ti by 8.2 wt % was obtained. The ethylene polymerization was performed in exactly the same way as in Example 1. The results of the ethylene polymerization are given in Table 1, and the reaction rate curves in FIG. 1.

EXAMPLE 6

A catalyst was produced in the same manner as in Example 3 except that to the n-hexane suspension of the magnesium containing carrier obtained in Example 3 was added so much of the TiCl$_3$(OC$_3$H$_7$) produced by mixing 7.1 ml of TiCl$_4$ and 6.0 ml of titanium propoxide (Ti(OC$_3$H$_7$)$_4$) that the Ti/Mg mole ratio reached 0.25. The catalyst thus obtained contained Ti by 2.5 wt %. The ethylene polymerization was performed in exactly the same way as in Example 1, the results being given in Table 1, and the reaction rate curves in FIG. 1.

EXAMPLE 7

Making use of the catalyst obtained in Example 3, a copolymerization of ethylene and 1-hexane was performed. The polymerization was performed in the same way as in Example 3, with the only exception that 150 cc of 1-hexane was used before the polymerization. As a result of the polymerization, a copolymer of ethylene and 1-hexane with a concentration of 0.947 g/cc was obtained. The results of this copolymerization are given in Table 1.

EXAMPLE 8

A catalyst was produced in exactly the same way as in Example 1, except that to the n-hexane suspension of the magnesium containing carrier obtained in Example 1 was added so much of TiCl$_2$(OC$_4$H$_9$)$_2$ produced by mixing 1.5 ml of TiCl$_4$ and 4.7 ml of titanium butoxide (Ti(OC$_4$H$_9$)$_4$) that the Ti/Mg mole ratio reached 0.25; in consequence, a catalyst containing Ti by 2.7 wt % was obtained. The polymerization of ethylene was performed in the same way as in Example 1. The results of the ethylene polymerization are given in Table 1.

COMPARATIVE EXAMPLE 1

A catalyst was produced in the same way as in Example 3 with the only exception that, in place of TiCl$_2$(OC$_3$H$_7$)$_2$, so much TiCl$_4$ was added that the Ti/Mg mole ratio reached 1, and the catalyst thus obtained contained Ti by 0.7 wt %. The ethylene polymerization was performed in exactly the same way as in Example 1, the results being given in Table 1 and the reaction rate curves in FIG. 1. Examples 5 and 6, where compounds of TiCl$_2$(OC$_3$H$_7$)$_2$ and TiCl$_3$(OC$_3$H$_7$) were used, each displays a low initial activity, but Comparative Example 1 shows a high initial activity.

TABLE 1

Results of Experiments for Polymerization Capability

| Exmp. | Ti (wt %) | Activity Kg-PE/ Gcat · hr | MI (2.16) | MI (21.6)/ MI (2.16) | BD (g/cc) | Span Ratio |
|---|---|---|---|---|---|---|
| 1 | 5.9 | 4.0 | 1.57 | 29 | 0.37 | <0.6 |
| 2 | 3.3 | 2.6 | 5.27 | 25 | 0.36 | <0.6 |
| 3 | 9.7 | 4.0 | 3.22 | 29 | 0.40 | <0.6 |
| 4 | 3.5 | 3.2 | 3.95 | 26 | 0.41 | <0.6 |
| 5 | 8.2 | 6.7 | 3.29 | 27 | 0.39 | <0.6 |
| 6 | 2.5 | 5.3 | 3.15 | 29 | 0.40 | <0.6 |
| 7 | 4.6 | 4.8 | 3.52 | 23 | 0.37 | <0.6 |
| 8 | 2.7 | 1.44 | 2.3 | 30 | 0.33 | <0.6 |
| Comp. 1 | 0.7 | 4.4 | 7.5 | 27 | 0.42 | <0.6 |

EXAMPLE 9

<A> Production of organomagnesium compounds

Inside a 5-liter glass reactor equipped with a stirrer and temperature controller, 146.0 g of magnesium powder (6.0 mol) and 2,250 ml of chlorobenzene (22 mol) were reacted in the presence of a solution in which 1,015 ml of dibutylether (6.0 mol), 15 ml of butylchloride and 0.25 g of iodine as initiator were dissolved. The reaction was performed, while stirring, at 80~100° C. in an inactive gaseous environment (nitrogen, argon) for 10 hours. Next, the reacted mixture was left alone, without stirring, for 12 hours, and then the liquid was separated from the precipitate. The liquid was a solution of the organomagnesium compound having the formula, MgPh$_2$.0.49MgCl$_2$.2(C$_4$H$_9$)$_2$O, dissolved in chlorobenzene (the concentration of Mg being 1.1 mol per liter).

<B> Production of carrier 2000 ml (Mg of 2.2 mol) of the solution obtained in <A> above was put in a reactor equipped with a stirrer, and 424.0 ml of CCl$_4$ (4.4 mol of CCl$_4$) dissolved in heptane of 840 ml was added to it at 20° C., in the period of an hour. The mixture was stirred at the same temperature for 60 minutes, the solvent was removed, and the precipitate was washed in 2000 ml of n-hexane at 60° C. four times. In this way, 236 g of the magnesium containing carrier in powder form was obtained in a state of suspension in n-hexane.

<C> Production of catalyst

To the n-hexane suspension of the magnesium containing carrier was added so much titanium alkoxychloride which was produced by mixing 30 ml of TiCl$_4$ and 76 ml of titanium propoxide (Ti(OC$_3$H$_7$)$_4$) that the Ti/Mg mole ratio reached 0.25. The reacted mixture was then heated to 60° C., stirred for two hours, and the solid precipitate thus obtained was washed in 2000 ml of n-hexane at 60° C. four times. Thus, a catalyst containing Ti by 3.3 wt % was produced. The average particle size of the catalyst was 55 μm.

<D> Pre-polymerization

The pre-polymerization of ethylene was performed inside a 200-liter steel reactor equipped with a stirrer and a temperature controller. N-hexane (150 l) was used as hydrocarbon solvent, and 932 ml of Al(n-Octyl)$_3$ with the concentration of 894 mMAl/liter, as cocatalyst was put into the reactor. Then, 2410 ml of the main catalyst with the concentration of 53.7 mMTi/liter was also put into the reactor. The pre-polymerization was performed, while stirring, by providing with an ethylene of 1.64 Kg/Hr and a hydrogen of 0.3 g/Hr, at 60° C. for 10 hours. After pre-polymerization, dried nitrogen was provided to obtain 16.4 Kg of dried pre-polymer which is in free-flowing state.

The properties of the pre-polymer were as follows:
Bulk density: 0.41 g/cc
Average size of pre-polymer: 224 μm
Span ratio: 0.41
Distribution of particle sizes:
  71.9 vol %<250 μm
  0.15 vol %<125 μm
  0.0 vol %<80 μm <E> Polymerization in gaseous fluidized bed A polymerization was performed in a polymerization reactor with the fluidized bed, which was composed of a perpendicular cylinder of 43 cm in diameter and 6.5 m in height.

The pressure of the gaseous mixture to be reacted was kept 20 Kgf/cm$^2$ and this mixture was passed through the fluidized bed of polyethylene powder, with an upward fluidizing speed of 47 cm/sec.

The pre-polymer produced in <D> was provided at regular intervals of time to the fluidized bed reactor, to produce 10 Kg/Hr of polymer. 80 kg of seed powder was initially put into the fluidized bed reactor. The reaction temperature, the gaseous composition and the properties of the polymer produced are given in Table 2.

As a result of observing the polymerization for seven consecutive days, it was found that production of polymer was kept constantly by 10 Kg/Hr without creating agglomerate or sheet. The quality of an ethylene copolymer produced by the above process was kept uniform and highly satisfactory.

COMPARATIVE EXAMPLE 2

A catalyst was produced in the same way as in Example 9 with an exception that, in place of titanium alkoxychloride, 120 ml of $TiCl_4$ was added to the magnesium containing carrier produced in Example 9 with the Ti/Mg mole ratio being 1. The thus obtained catalyst contained 0.9 wt % of Ti. The pre-polymerization was performed in the same way as in Example 9 with an exception that the main catalyst with the concentration of 14.6 mMTi/liter was used instead of the one with 53.7 mMTi/liter. As a result of pre-polymerization, 16.4 Kg of dried pre-polymer was obtained in a state of free-flowing.

The properties of the pre-polymer were as follows:
Bulk density: 0.36 g/cc
Average size of pre-polymer: 240 μm
Span ratio: 0.5
Distribution of particle sizes:
  70.1 vol %<250 μm
  0.12 vol %<125 μm
  0.0 vol %<80 μm The pre-polymer produced above was supplied to the fluidized bed reactor introduced in Example 9 at regular intervals of time, to produce a polymer of 10 Kg/Hr. 80 kg of seed powder was initially put into the fluidized bed reactor. The reaction temperature, the gaseous composition and the properties of the polymer produced are given in Table 2.

As a result of observing the polymerization for consecutive days, on the second day from when the polymerization reaction started, the polymer removal path was blocked because it was full stuffed with agglomerate so that further polymerization was impossible. In the course of polymerization, the fluctuation of the polymerization temperature by hot spot was observed.

TABLE 2

Results of Experiments on Gaseous Polymerization

| | Division | Exm. 9 | Comp. 2 |
|---|---|---|---|
| Conditions | C4/C2 mole ratio | 0.3 | 0.26 |
| | H2/C2 mole ratio | 0.25 | 0.25 |
| | Fluidizing linear velocity cm/sec | 45 | 45 |
| | Polymerization temperature ° C. | 78 | 78 |
| Properties of Polymer | Melt Index | 1.0 | 1.0 |
| | Melt flow ratio | 28 | 26 |
| | Density | 0.920 | 0.920 |
| | Ti ppm | 3 | 1 |
| Characteristics of Polymer Particle | Bulk density | 0.4 | 0.36 |
| | Average particle size | 1200 | 1200 |
| | Span ratio | 0.45 | 0.5 |

[Effects of Invention]

According to the present invention, a catalyst is obtained which has a narrow particle size distribution and a high activity and when a polymerization is performed with the use of the catalyst obtained in the present invention, its initial activity is low but it slowly rises to reach an optimal degree, thereby the polymerization can be performed without generation of agglomerate in a gaseous fluidized bed reactor. The polymer produced with the use of this catalyst possesses a narrow distribution of molecular weights.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for producing a catalyst for polymerization of ethylene and for copolymerization of ethylene and an α-olefin, comprising:

reacting an organomagnesium compound having the formula $MgPh_2 \cdot nMgCl_2 \cdot mR_2O$, wherein Ph=phenyl, n=0.37–0.7, m≧1, R is an alkyl radical having two to eight carbons, with carbon tetrachloride to form a magnesium-containing carrier, wherein the organomagnesium compound is a reaction product of metallic magnesium with chlorobenzene in the presence of an ether, the ether having the structure $R_2O$, where R is an alkyl radical having two to eight carbons, wherein the carbon tetrachloride/Mg mole ratio is about 0.5 or more, and wherein the reaction is performed at a temperature of about −20–80° C., and treating the magnesium-containing carrier with a titanium alkoxyhalide.

2. The method according to claim 1, wherein said ether is dibutyl etheror diisoamyl ether.

3. The method according to claim 1, further comprising coating the catalyst, for pre-polymerization, with 3–150 g of an ethylene homopolymer or a copolymer of ethylene and α-olefin per one gram of the catalyst.

4. The method according to claim 1, wherein said titanium compound is represented by the general formula of $Ti(OR)_nX_{4-n}$, wherein R represents an aliphatic or an aromatic hydrocarbon group having from 1 to 14 carbons, or COR', wherein R' is an aliphatic or aromatic hydrocarbon group, and wherein R' has from 1 to 14 carbons, and wherein X is Cl, Br, or I, and wherein n is 1, 2, or 3.

5. The method according to claim 1, further comprising treating the magnesium-containing carrier with an organoaluminum compound subsequent to treating the magnesium-containing carrier with the titanium compound, wherein the Al/Ti mole ratio is between about 0.1–2.

6. The method according to claim 4, wherein said titanium compound is a titanium alkoxychloride.

7. A catalyst for polymerization of ethylene and for copolymerization of ethylene and an α-olefin, formed by the method comprising:

reacting an organomagnesium compound having the formula $MgPh_2 \cdot nMgCl_2 \cdot mR_2O$, wherein Ph=phenyl, n=0.37–0.7, m≧1, R is an alkyl radical having two to eight carbons, with carbon tetrachloride to form a magnesium-containing carrier, wherein the carbon tetrachloride/Mg mole ratio is about 0.5 or more, and wherein the reaction is performed at a temperature of about −20–80° C., and treating the magnesium-containing carrier with a titanium alkoxyhalide.

8. The catalyst of claim 7, wherein the organomagnesium compound is produced by reacting metallic magnesium with chlorobenzene in the presence of an ether, the ether having the formula $R_2O$, where R is an alkyl radical having two to eight carbons.

9. The catalyst of claim 7, wherein the titanium alkoxyhalide is represented by the general formula $Ti(OR)_nX_{4-n}$, Wherein R represents an aliphatic or an aromatic hydrocarbon group having from 1 to 14 a carbons, or COR', wherein R' is an aliphatic or aromatic hydrocarbon group having from 1 to 14 carbons, wherein X is Cl, Br, or I, and wherein n is 1, 2, or 3.

10. The catalyst of claim 7, wherein said magnesium-containing carrier is treated with an organic aluminum compound subsequent to treating the magnesium-containing carrier with the titanium compound.

* * * * *

UNITED STATES PATENT AND TRADEMARK OFFICE
CERTIFICATE OF CORRECTION

PATENT NO. : 6,482,764 B1
DATED : November 19, 2002
INVENTOR(S) : Chang et al.

It is certified that error appears in the above-identified patent and that said Letters Patent is hereby corrected as shown below:

Column 10,
Line 38, please delete "etheror" and substitute therefor -- ether or --.

Column 12,
Line 8, please delete "compound" and substitute therefor -- alkoxyhalide --.

Signed and Sealed this

Twenty-second Day of July, 2003

JAMES E. ROGAN
*Director of the United States Patent and Trademark Office*